United States Patent Office 3,120,823
Patented Feb. 11, 1964

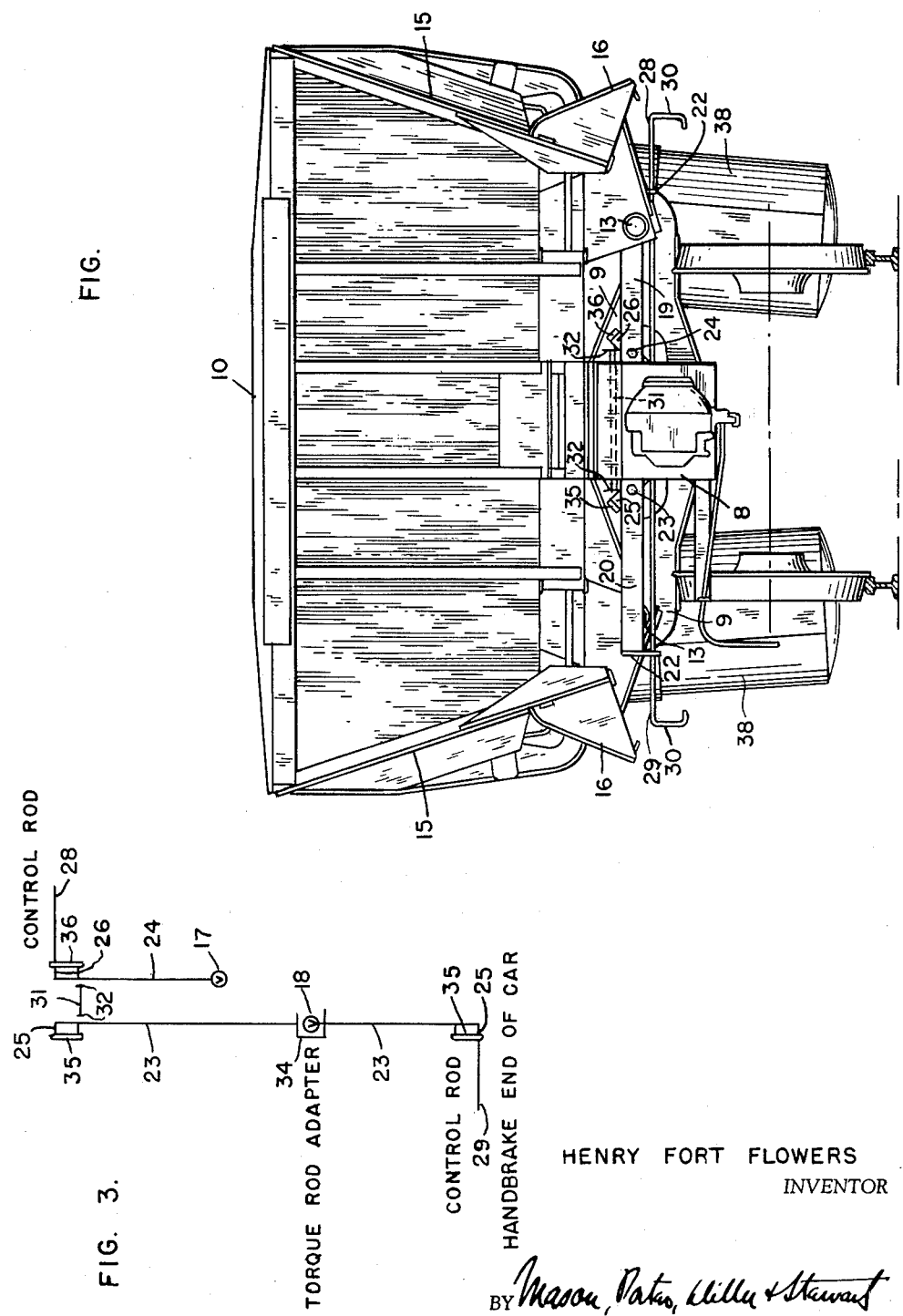

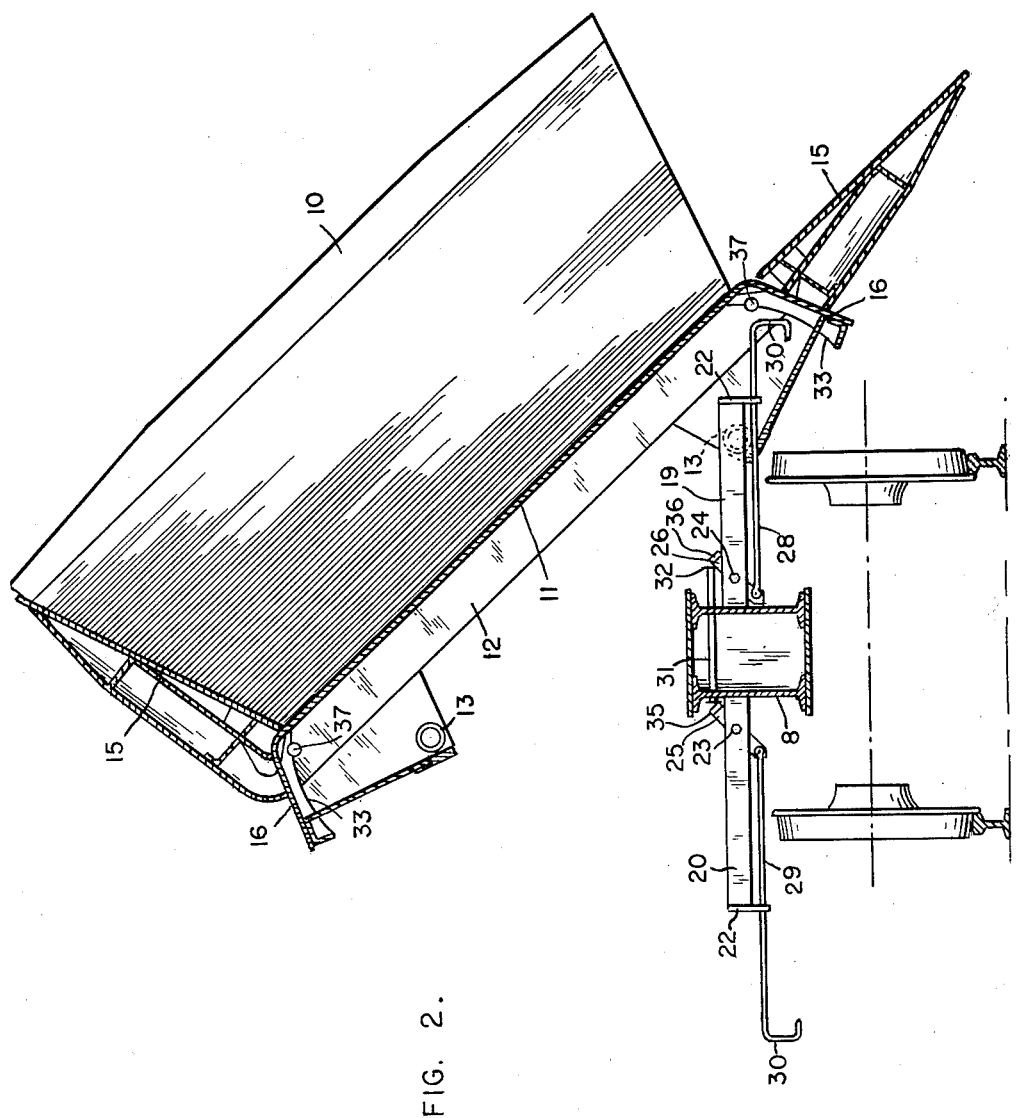

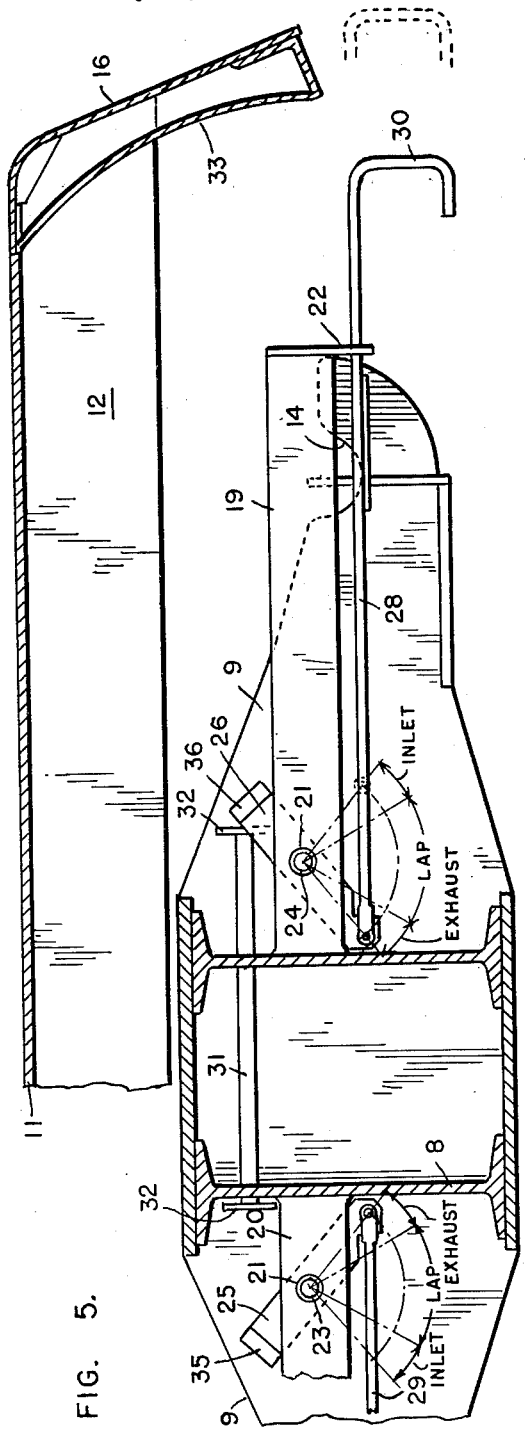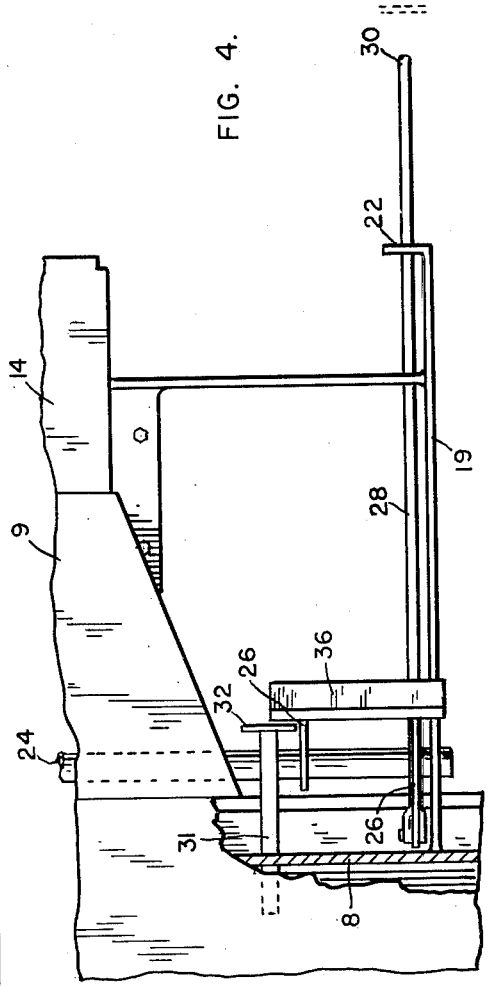
HENRY FORT FLOWERS
INVENTOR
ATTORNEYS

3,120,823
SAFETY INTERLOCK FOR TILTING DUMP CAR VALVE ACTUATORS
Henry Fort Flowers, P.O. Box 238, Findlay, Ohio
Filed May 22, 1959, Ser. No. 815,013
6 Claims. (Cl. 105—273)

The invention of which the following is a detailed specification, relates to a safety interlock for dump car valves as applied to mine cars and similar railway and road vehicles for the handling of bulk material.

Dump cars of this type are well known and characterized by car bodies which are pivoted in trunnion bearings on both sides of the underbody, so that either side may be hoisted by cylinders operated by air pressure thus enabling the load of the car to be discharged at the side of the track or roadway through an opened side of the vehicle. The hoisting means consists of cylinders operated with air pressure to elevate one side of the vehicle while the opposite side of the vehicle is opened to discharge the load. The valves for such air pressure cylinders are of the three-way type in which the air under pressure is introduced in the cylinder and is discharged or exhausted to the atmosphere when it is desired to lower the car body. There is, however, an intermediate lap during which the valve is closed and the pressure is maintained in the cylinder prior to its ultimate release. A three-way rocker valve of this type is disclosed and described in my patent issued May 22, 1956, No. 2,746,484.

There is of course a separate valve on each side of the dump car connected to the hoisting cylinders on that side. It is extremely important that when the car body is hoisted on one side, no air pressure is delivered to the hoisting cylinders on the opposite side. This is necessary to prevent the car body from being lifted out of the trunnion bearings on both opposite sides simultaneously.

Some interconnection has therefore been arranged to disable the hoisting mechanism on the down side of the car.

The present invention provides a specific means for accomplishing this purpose.

One object of the invention is thus to render inoperative the control for the hoisting means on one side of the car whenever the hoisting means on the opposite side of the car is actuated.

Another object of the invention is to positively exhaust the air pressure in the hoisting cylinders on the side of the car opposite the side being hoisted.

A further object of my invention is to make impossible the inadvertent movement of the manual control rod on the side opposite the one being hoisted.

A still further object of the invention is to operate the control rods by pull from points beyond the track so that any slipping by the operator takes him away from the track rather than toward it and under the dump car.

Among the objects of my invention is to locate the valve operating means within the protective extent of the car body.

An incidental object of the invention is to reduce the number of parts required and to simplify their operation.

For the purpose of illustrating the invention I have shown the preferred form by way of example on the accompanying drawings on which FIG. 1 is an end view of a dump car equipped with the improved safety interlock for the valves;

FIG. 2 is a transverse vertical section of the car in tilted position;

FIG. 3 is a diagrammatic view of the interlocking means;

FIG. 4 is an enlarged fragmentary plan view partly in section, of the valve control mechanism, and FIG. 5 is an enlarged fragmentary side elevation of the same.

Briefly described, the invention consists in providing an interlock between the operating means for the three-way valves on opposite sides of the dump car to insure safety in operation. This is accomplished by extending the operating means to points laterally of the underframe of the car. The novel features include coupling the operating parts so that the operation of one valve serves to mechanically place the opposite valve in inoperative position and hold it there until the manual control rod is used to lower the car body to horizontal position. Only after this has been accomplished will it be mechanically possible to open the three-way valve on the opposite downturned side. Furthermore, the opening movement of the inactive valve is positively blocked during the entire time when the car body is tilted so that both valves cannot be opened simultaneously.

The dump car has been illustrated as mounted on wheels and track. The underframe includes a center sill 8 of box type formed of I-beams and connecting webs. Bolsters 9 extend laterally from the center sill. This is conventional construction and the mounting on the trucks and associated parts of the car is not illustrated in detail.

The car body 10 includes a floor 11 having transverse reinforcing beams 12. Pivots 13, 13 on opposite sides of the car body rest in trunnion supports 14 on bolsters 9. The sides of the car body 10 are in the form of down folding doors 15, 15. These are hinged at the bottom at 37 and adapted to open mechanically when the car body is tilted in their direction.

There is a side skirt 16, 16 depending from the floor bottom at each side under the doors and tilting outwardly.

The usual hoisting cylinders 38, 38 are arranged on the underframe on each side and adapted to tilt the car body on the trunnion supports on the farther side. These hoisting cylinders are not shown on the drawing, as they may be readily found fully described in my prior Patents 2,738,733 and 2,826,999, to which reference is made for detailed information.

In like manner the operation of the three-way valves is well known. These valves are diagrammatically indicated at 17, 18 on FIG. 3.

Brackets 19 and 20 extend laterally from the center sill 8 in each direction, as shown in FIG. 5. These brackets provide guide bearings 21, 21.

The outer ends of the brackets 19 and 20 provide loose collars 22.

The guide bearings 21, 21 are journals for torque tubes 23, 24 which extend longitudinally of the underframe. Adjacent each bracket 19, 20, each torque tube has a crank arm 25, 26. This arm is fastened at its middle point to the torque tube 23, 24. The upper end of each arm 25, 26 has a counterweight 35, 36 respectively.

The opposite ends of the arms 25, 26 below the brackets 19 and 20, are pivotally connected to pull rods 28, 29 ending in handles 30 beyond the collars 22.

A reciprocating rod 31 is journaled for movement sideways through the center sill 8 in the horizontal plane of the counterweights 35, 36. The rod 31 has a cap 32 at each end. These caps are alternatively movable into the arcuate paths of the counterweights 35, 36.

The rod 31 is substantially as long as the distance between the torque tubes or shafts 23, 24. It follows that rocking motion of the arms 25, 26 will cause the rod 31 to move in one or the other direction sideways.

When the car body is horizontal, the hoisting cylinders will have been exhausted by the handles 30 being pushed inwardly. This leaves the arms 25, 26 tilted outwardly at their tops, so that they are out of reach of the rod 31.

The cylinders on both sides of the car will therefore be inactive and the arms both tilted outwardly. However, if the control rod 28 is drawn out to its extreme limit, as shown in FIG. 5, the torque shaft 24 is rocked to open the inlet for air pressure to the cylinders on that side. This will cause the cylinders to lift the car body on the trunnions on the opposite side thus tilting the car body into dumping position.

In the course of this movement, the rod 31 will have been moved to the left as shown in FIG. 5 ahead of the counterweight 36 on the arm 26. The end plate or cap 32 will therefore be moved outward to block the counterweight 35 and the arm 25. The latter cannot therefore move into open position for the valve or to permit this result to be accomplished by manual pull on the rod 29. The rod 29 will therefore be held inward as long as the arm 26 has been rocked to the center.

To restore the car body to normal horizontal position, it is only necessary to push in on the handle 30 so that the arm 26 is rocked clockwise and the torque shaft 24 returned to the exhaust position for the valve.

The rod 31 does not necessarily follow the arm 26 in this movement.

However, the rod will be moved in advance of either arm 25 or 26 on its inward movement.

The range of movement of the operating rod 28 and the rock arm 26 is indicated on FIG. 5. When the control rod 28 is at the inward position, the torque tube 24 is rotated to open the operating valve 17. This is the normal inactive position for both operating valves. An outward pull on the handle 30 moves the control rod 28 laterally outward. During the initial movement the valve is not open. However, at the farther end of travel, the valve is open providing an inlet for the air pressure to the operating cylinders. When this occurs, the nearer end of the car body is hoisted, the side door on the opposite side is tilted out and the load discharged.

In this operation the opposite rock arm 21 is blocked or obstructed by the rod 31.

By pushing in on handle 30, the control rod 28 first closes the inlet and finally opens the exhaust from the operating valve controlled by the torque tube 24. This movement rocks the rock arm 26 back into the position shown in FIG. 5. However, the rod 31 remains in the left position. The control is in position to repeat the same upward tilting of the car body. However, it will be understood that the car body can be tilted in the opposite direction by the rock arm 25 moving inward under the control of the rod 29. In this position the rod 31 blocks the rock arm 26 and holds the torque tube 24 in the valve exhausting position.

In the last case where the car body 11 is tilted to the right as shown in FIG. 2, provision is made to prevent the operating valve 17 being opened by inadvertent movement of the torque tube 24.

To effect this result, the skirt 16 on each side of the car body is provided with a baffle 33. This baffle is curved as shown in FIGS. 2 and 5. As the car body tilts down into the position shown in FIG. 2, the baffle 33 is brought down opposite the handle 30. The baffle forms a stop or shield against the outward movement of the handle and consequently against opening of the operating valve on that side.

In FIG. 3, the control rods 28 and 29 have been shown as in position at opposite ends of the car. Control rod 28 and rock arm 26 operate torque tube 24 directly connected with the operating valve 17 for the nearer cylinders.

The control rod 29 on the opposite side of the car, however, is located at the other end of the car. The rock arm 25 is connected to torque tube 23. In this instance the torque tube 23 is divided into two parts connected by an adapted 34 associated with the valve 18. The far end of the tube 23 runs to the end of the car on which the control rod 28 is mounted. At that point a second rock arm 25 is located opposite the slide 31.

In this arrangement operation of the control rod 28 operates through both sections of the rod 23 to hold the valve 18 in exhaust position and the control rod 29 inward.

From the above description it will be understood that positive means are provided for preventing the hoisting means on one side of the car being operated simultaneously with the hoisting means on the opposite side of the car. The air pressure for the hoisting cylinders on the side of the car opposite that being hoisted, is positively held in exhaust poistion. It will be impossible to move the manual control rod on the downturned side opposite the one being hoisted. The control means is provided well within the protective extent of the car but so arranged that its operation is particularly safe for the user. In case of mischance he will fall clear of the track.

While the preferred form of the invention has been illustrated by example, the invention may, however, be embodied in various forms, proportions and material within the scope of the following claims.

What I claim is:

1. In a tilting dump car having an underframe and separate elevating means thereon for tilting the car body in each sideways direction for discharge, independently operated valves, means connecting each valve to one of said elevating means, separate valve-actuating rock shafts journaled on the underframe and means connecting each shaft with one of said valves, a rock arm having its middle point attached to each rock shaft, a horizontal rod transversely mounted on the underframe and having each end movable by one of said rock arms to bring the opposite end of the rod into the arcuate path of the other rock arm, and two laterally movable control rods carried by the underframe and each having an end connected to an end of the adjacent rock arm.

2. In a tilting dump car having an underframe and separate elevating means thereon for tilting the car body in each sideways direction for discharge, independently operated valves, means connecting each valve to one of said elevating means, separate valve-actuating rock shafts journaled on the underframe, and means connecting each shaft with one of said valves, a rock arm having its middle point attached to each rock shaft, a horizontal rod transversely mounted on the underframe, with its opposite ends each movable by one of said rock arms in its inward movement to bring the opposite end of the rod into the arcuate path of the other rock arm, and two laterally movable control rods each carried by the underframe and each having an end connected to an end of the adjacent rock arm.

3. In a tilting dump car having an underframe and separate elevating means thereon for tilting the car body in each sideways direction for discharge, independently operated valves, means connecting each valve to one of said elevating means, separate valve-actuating rock shafts journaled on the underframe and means connecting each shaft with one of said valves, a rock arm having its middle point attached to each rock shaft, a horizontal rod transversely mounted on the underframe and being substantially as long as the distance between said rock shafts, said rod having each end movable by one of said rock arms to bring the opposite end of the rod into the arcuate path of the other rock arm, and two laterally movable control rods carried by the underframe and each having an end connected to an end of the adjacent rock arm.

4. In a tilting dump car having an underframe and separate elevating means thereon for tilting the car body in each sideways direction for discharge, independently operated valves, means connecting each valve to one of said elevating means, separate valve-actuating rock shafts journaled on the underframe and means connecting each shaft with one of said valves, a rock arm having its middle point attached to each rock shaft, a counterweight on the upper end of each arm, a horizontal rod transversely mounted on the underframe and having each end movable by the counterweight of one of said rock arms to bring the opposite end of the rod into the arcuate path of the counterweight of the other rock arm, and two laterally movable control rods carried by the underframe, and each having an end connected to the free end of the adjacent rock arm.

5. In a tilting dump car having an underframe and separate elevating means thereon for tilting the car body in each sideways direction for discharge, independently operated valves, means connecting each valve to one of said elevating means, separate valve-actuating rock shafts journaled on the opposite sides of one end of the underframe for each valve, a rock arm having its middle point attached to each rock shaft, a horizontal rod transversely mounted on said end of the underframe, and having each end movable by one of said rock arms to bring the opposite end of the rod into the arcuate path of the other rock arm, a laterally movable control rod carried by the underframe at said end of the car, and having an end connected to an end of the adjacent rock arm, the other of said rock shafts having an extension to the opposite end of the car, a rock arm on said extension and a laterally movable control rod carried by the underframe at said second end of the car and having an end connected to an end of the adjacent rock arm.

6. In a tilting dump car having an underframe and elevating means thereon for tilting the car body in each sideways direction for discharge, an operating valve, means connecting said valve to said elevating means, a valve-actuating rock shaft journaled on the underframe and means connecting said rock shaft with said valve, a transversely movable control rod carried by the underframe and connected to an end of the rock arm, and a depending stop on the car body movable into blocking position opposite the rod when the car body is tilted down on that side.

References Cited in the file of this patent
UNITED STATES PATENTS

| | | |
|---|---|---|
| 1,248,312 | Gow | Nov. 27, 1917 |
| 1,251,770 | Gow | Jan. 1, 1918 |
| 1,283,735 | Gow | Nov. 18, 1918 |
| 1,972,042 | Flowers | Aug. 28, 1934 |
| 1,985,653 | Christie et al. | Dec. 25, 1934 |
| 2,307,284 | Magee | Jan. 5, 1943 |
| 2,588,133 | Lunde | Mar. 4, 1952 |
| 2,646,474 | Stratton | July 21, 1953 |
| 2,738,733 | Flowers | Mar. 20, 1956 |